US012368268B2

(12) United States Patent
Ito et al.

(10) Patent No.: US 12,368,268 B2
(45) Date of Patent: Jul. 22, 2025

(54) CONNECTOR WITH LOCKING PORTION

(71) Applicant: SUMITOMO WIRING SYSTEMS, LTD., Mie (JP)

(72) Inventors: Toshihiro Ito, Mie (JP); Takahiro Kikuchi, Mie (JP); Tsuyoshi Mase, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 232 days.

(21) Appl. No.: 18/021,501

(22) PCT Filed: Jul. 29, 2021

(86) PCT No.: PCT/JP2021/028206
§ 371 (c)(1),
(2) Date: Feb. 15, 2023

(87) PCT Pub. No.: WO2022/044688
PCT Pub. Date: Mar. 3, 2022

(65) Prior Publication Data

US 2023/0299539 A1 Sep. 21, 2023

(30) Foreign Application Priority Data

Aug. 26, 2020 (JP) ................................ 2020-142474

(51) Int. Cl.
*H01R 13/629* (2006.01)

(52) U.S. Cl.
CPC .............................. *H01R 13/62933* (2013.01)

(58) Field of Classification Search
CPC ......................... H01R 13/62; H01R 13/62938; H01R 13/639; H01R 13/509; H01R 13/62933; H01R 13/629
See application file for complete search history.

(56) References Cited

U.S. PATENT DOCUMENTS

2002/0177338 A1 11/2002 Nishide et al.
2002/0182491 A1* 12/2002 Maegawa ........ H01R 13/62933 429/157

(Continued)

FOREIGN PATENT DOCUMENTS

JP 2010-287427 A 12/2010
JP 2015-064957 A 4/2015

OTHER PUBLICATIONS

International Search Report issued on Oct. 19, 2021 for WO 2022/044688 A1 (4 pages).

*Primary Examiner* — Tulsidas C Patel
*Assistant Examiner* — Carlos E Lopez-Pagan
(74) *Attorney, Agent, or Firm* — Venjuris, P.C.

(57) ABSTRACT

A lever is supported so as to be rotatable with respect to a housing to a temporary locking position and a main locking position. One of the housing and the lever is provided with a first locking portion capable of flexible deformation, and another is provided with a second locking portion. The first locking portion includes a first apex portion and a first locking surface that is connected to the first apex portion. The second locking portion includes a second locking surface that contacts the first locking portion and stops the lever at the temporary locking position. The second locking surface includes an inclined side that is disposed, in a state where the first locking portion has bent due to interference between the first apex portion and the second locking portion, so as to be inclined from the first apex portion toward the first locking surface.

8 Claims, 10 Drawing Sheets

(56) References Cited

U.S. PATENT DOCUMENTS

2016/0079699 A1 3/2016 Kobayashi et al.
2016/0240969 A1 * 8/2016 Matsuura ......... H01R 13/62938
2017/0077639 A1 * 3/2017 Sundarakrishnamachari .............. H01R 13/4538
2018/0205176 A1 * 7/2018 Shimizu ............. H01R 13/4361
2019/0229466 A1 * 7/2019 Tsukiyoshi ....... H01R 13/62938
2020/0099164 A1 * 3/2020 DeWitte ................. H01R 13/62

* cited by examiner

CONNECTOR WITH LOCKING PORTION

CROSS REFERENCE TO RELATED APPLICATIONS

This application is a national phase of PCT application No. PCT/JP2021/028206, filed on 29 Jul. 2021, which claims priority from Japanese patent application No. 2020-142474, filed on 26 Aug. 2020, all of which are incorporated herein by reference.

TECHNICAL FIELD

The present disclosure relates to a connector.

BACKGROUND

A connector disclosed in Patent Document 1 includes a housing and a lever rotatably supported by the housing. The housing has a housing-side locking portion capable of flexible deformation. The lever has a lever-side locking portion. Due to the lever-side locking portion locking onto the housing-side locking portion, the lever is stopped at a temporary locking position with respect to the housing. The same type of connector is also disclosed in Patent Document 2.

PRIOR ART DOCUMENT

Patent Document

Patent Document 1: JP 2015-064957 A
Patent Document 2: JP 2016-152062 A

SUMMARY OF THE INVENTION

Problems to be Solved

If an external force inadvertently acts upon the lever at the temporary locking position, the locking of the lever-side locking portion and the housing-side locking portion may be released. If the engagement of the lever-side locking portion and the housing-side locking portion becomes completely released, the lever will rotate, which enables the operator to notice that the lever is not in the locked state. However, the lever may remain at the temporary locking position in an incompletely held state where the housing-side locking portion has flexibly deformed and the lever-side locking portion faces and contacts a protruding part of the housing-side locking portion. Since it is difficult to notice this state, the operator may rotate the lever that is at the temporarily locked position but is not in the locked state. When this happens, the operator will not experience a moderate feeling of release normally experienced when the lever is released from the locked state, resulting in the risk of the task of fitting the connector not proceeding appropriately.

It is an object of the present disclosure to provide a connector where the locking state of a lever can be appropriately released.

Means to Solve the Problem

A connector according to an aspect of the present disclosure includes: a housing; and a lever that is supported by the housing and rotates from a temporary locking position to a main locking position to progressively fit the housing together with a mating housing, wherein one of the housing and the lever is provided with a first locking portion capable of flexible deformation and another of the housing and the lever is provided with a second locking portion, the first locking portion has a first apex portion and a first locking surface that is connected to the first apex portion, the second locking portion has a second locking surface that contacts the first locking portion and stops the lever at the temporary locking position, and the second locking surface has an inclined side which is disposed, in a state where the first locking portion has bent due to interference between the first apex portion and the second locking portion, so as to be inclined from the first apex portion toward the first locking surface.

Effect of Invention

According to the present disclosure, it is possible to provide a connector where the locking state of a lever can be appropriately released.

DETAILED DESCRIPTION TO EXECUTE THE INVENTION

Figure 1:
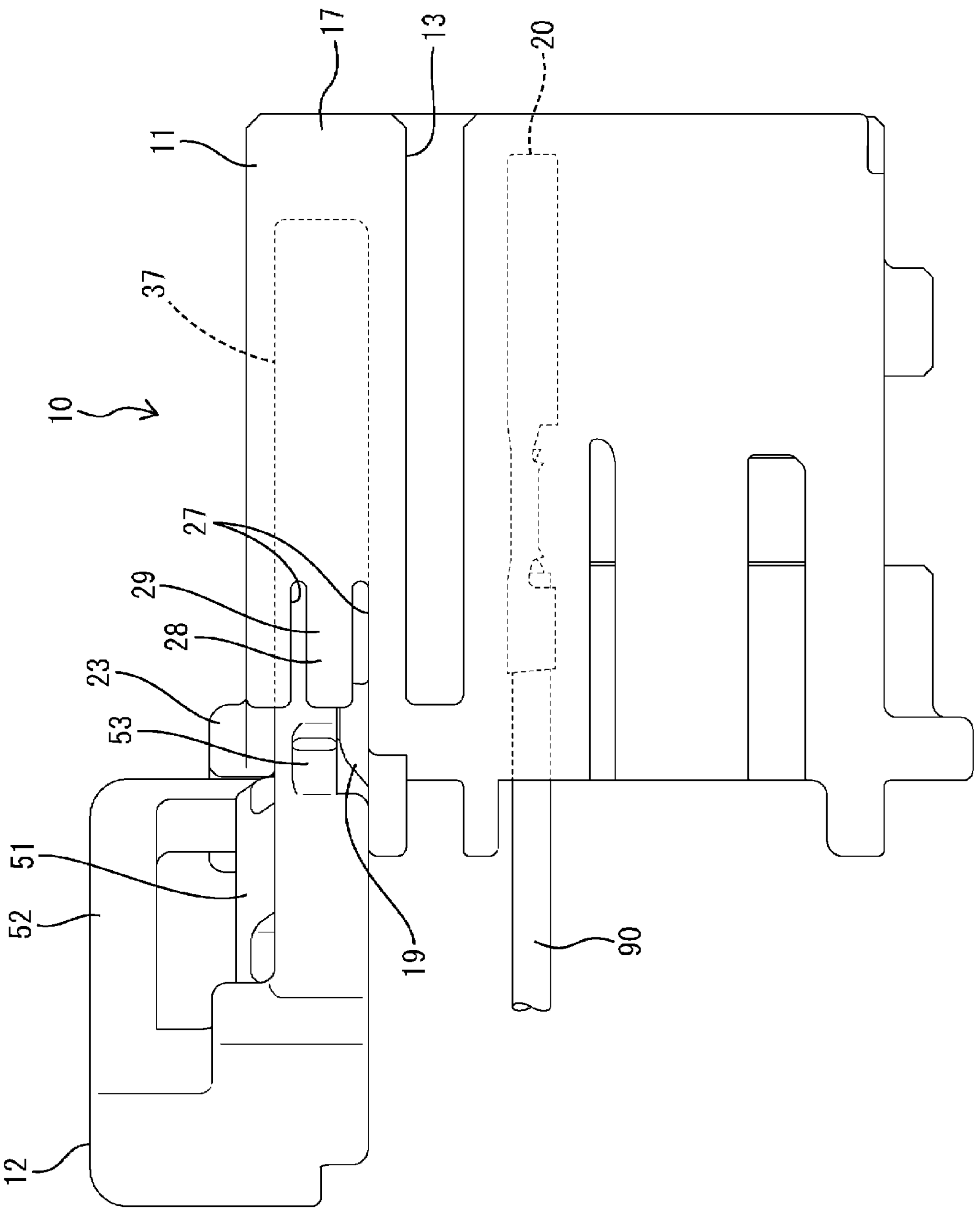
FIG. 1 is a side view depicting a state where, for a connector according to a first embodiment, a lever is disposed close to one end of a range of play at a temporary locking position with respect to a housing.

[Outline of Embodiments of the Present Disclosure]

Several embodiments of the present disclosure will first be listed and described in outline.

(1) A connector according to the present disclosure includes: a housing; and a lever that is supported by the housing and rotates from a temporary locking position to a main locking position to progressively fit the housing together with a mating housing, wherein one of the housing and the lever is provided with a first locking portion capable of flexible deformation and another of the housing and the lever is provided with a second locking portion, the first locking portion has a first apex portion and a first locking surface that is connected to the first apex portion, the second locking portion has a second locking surface that contacts the first locking portion and stops the lever at the temporary locking position, and the second locking surface has an inclined side which is disposed, in a state where the first locking portion has bent due to interference between the first apex portion and the second locking portion, so as to be inclined from the first apex portion toward the first locking surface.

If the lever is inadvertently rotated within the range of play at the temporary locking position, the first locking portion becomes temporarily bent due to interference between the first apex portion and the second locking portion. However, since the second locking surface of the second locking portion has an inclined side, the second locking portion can receive the pressing force of the first apex portion and become displaced toward the side facing the first locking surface. Accordingly, the first locking portion and the second locking portion can be quickly returned to a lockable state, and bending of the first locking portion can be automatically eliminated.

When performing a rotation operation of the lever, the operator can moderately experience that the bending of the first locking portion has been eliminated and the first locking portion and the second locking portion are in a locked state. This means that according to the above configuration, the locked state of the lever at the temporarily locked position can be appropriately released.

Note that the expression "side" in the present specification refers to an edge on a plane in a cross-section that intersects the plane, and includes not only line segments but also curves. In a definition of a "side" as a line that joins apex points, the "apex points" may be on a curve (or curved surface).

(2) The second locking portion preferably includes a second rising surface disposed on an opposite side to the second locking surface and a top portion disposed between the second rising surface and the inclined side.

With this configuration, by changing the position of the top portion relative to the first locking portion, it is possible to easily adjust the angle of inclination and/or the formation range of the inclined side.

(3) The second locking surface may include a locking side that intersects the inclined side with a second apex portion in between, and when the first locking portion is in a natural state at the temporary locking position, the locking side may be disposed so as to face and contact the first locking surface in parallel or at a shallower angle of inclination than the inclined side.

With this configuration, even when the second locking surface has an inclined side, it is possible for the locking side to favorably contact the first locking surface. This means that it is possible to maintain or increase the locking force of the second locking portion on the first locking portion.

(4) The housing may include a housing-side locking portion, the lever may include a lever-side locking portion that is locked to the housing-side locking portion at the temporary locking position, one of the housing-side locking portion and the lever-side locking portion may be capable of flexible deformation, a locking state of the housing-side locking portion and the lever-side locking portion may be released by a release portion of the mating housing, a gap, which allows the one of the housing-side locking portion and the lever-side locking portion to deform, may be formed between the lever-side locking portion and the housing-side locking portion, and the lever may be capable of rotating with respect to the housing within a range of the gap at the temporary locking position.

With this configuration, it is easy to rotate the lever in a range of play at the temporary locking position including the gap described above, and easy to release the locked state of the lever at the temporary locking position. However, according to the present disclosure, even if the lever rotates within the range of play at the temporary locking position, the second locking surface does not stop on to the first apex portion, and the first locking portion and the second locking portion can return to the lockable state, which means that the locked state of the lever can be favorably ensured.

[Detailed Description of Embodiments of the Present Disclosure]

Specific embodiments of the present disclosure are described below with reference to the drawings. It should be noted that the present invention is not limited to the examples described here, and is instead indicated by the claims and is intended to include all modifications within the meaning and scope of the claims and their equivalents.

(First Embodiment)

A connector 10 includes a housing 11 and a lever 12 that is rotatably supported by the housing 11. The housing 11 is fitted into a mating housing 100. The lever 12 rotates with respect to the housing 11 from a temporary locking position to a main locking position, which progressively fits the two housings 11 and 100 together. Note that in the following description, it is assumed that in the front-rear direction, the surfaces where the two housings 11 and 100 face each other at the start of a fitting operation are the respective front sides. The expression "vertical direction" is based on the vertical direction in FIGS. 1 and 8. The expression "width direction" is based on the left-right direction in the drawings aside from FIG. 1.

(Mating Housing)

Figure 4:
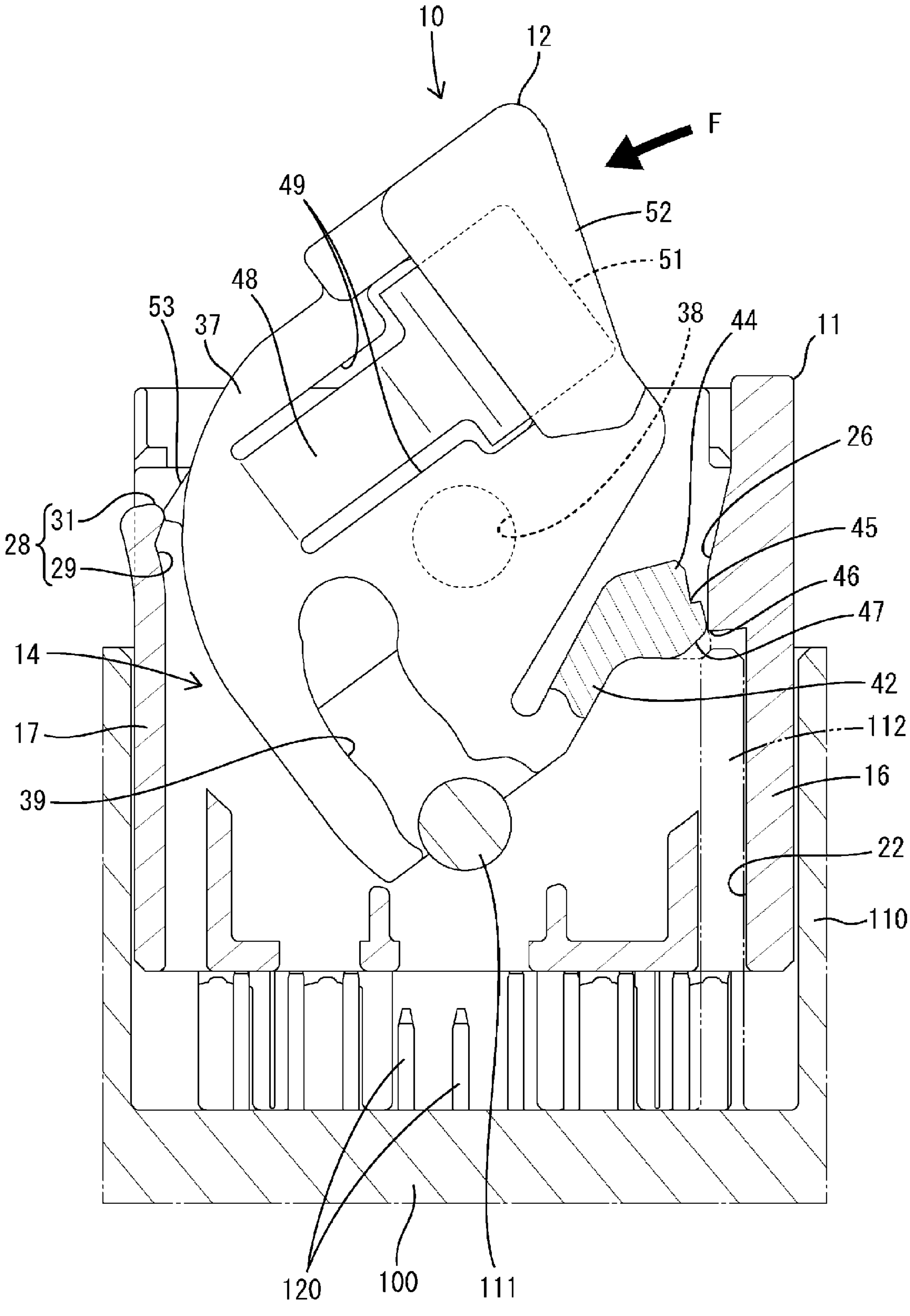
FIG. 4 is a broken plan view depicting a state where the lever has rotated to the other end of the range of play at the temporary locking position and a first locking portion has temporarily bent due to interference between a first apex portion and a second locking portion.
Figure 8:
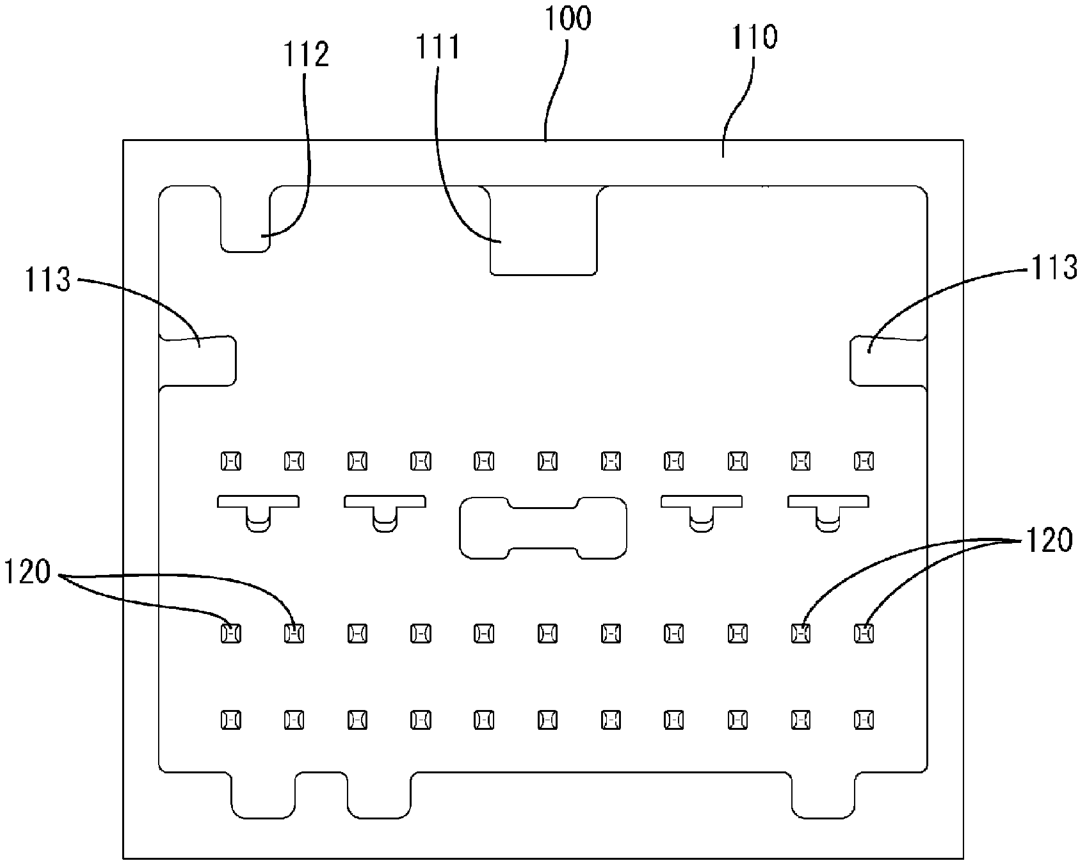
FIG. 8 is a front view of a mating housing.

The mating housing 100 is made of synthetic resin and, as depicted in FIGS. 4 and 8, has a square tubular hood portion 110 that is open at the front. The hood portion 110 has a cam follower 111 in the form of a circular column that protrudes downward at a center in the width direction on an inner surface of an upper wall. At one end in the width direction of the inner surface of the upper wall, the hood portion 110 has a rib-shaped release portion 112 that protrudes downward and extends in the front-rear direction. At upper ends of inner surfaces of left and right side wall parts, the hood portion 110 has a pair of guide portions 113 that project outward toward each other and extend in the front-rear direction.

A plurality of male terminal fittings 120 are disposed so as to protrude on the inside of the hood portion 110. The male terminal fittings 120 are each shaped like a tab and are arranged vertically and horizontally in a space below the guide portions 113 inside the hood portion 110.

(Housing)

The housing 11 is made of synthetic resin and formed in the overall shape of a square block. As depicted in FIG. 4, the housing 11 is fitted inside the hood portion 110. As depicted in FIG. 1, a plurality of female terminal fittings 20 are housed in the housing 11 (only one female terminal fitting 20 is illustrated in FIG. 1). Each female terminal fitting 20 is disposed at a position corresponding to a male terminal fitting 120. Each female terminal fitting 20 are connected to one end of an electric wire 90.

The housing 11 has, at upper ends (the reference numeral 17 side in FIG. 1) of left and right side walls 16 and 17, a pair of guide channels 13 (only one is illustrated in FIG. 1) that extend in the front-rear direction and are open at the front. An operation that fits together the two housings 11 and 100 is guided by inserting the guide portions 113 into the guide channels 13.

Figure 2:
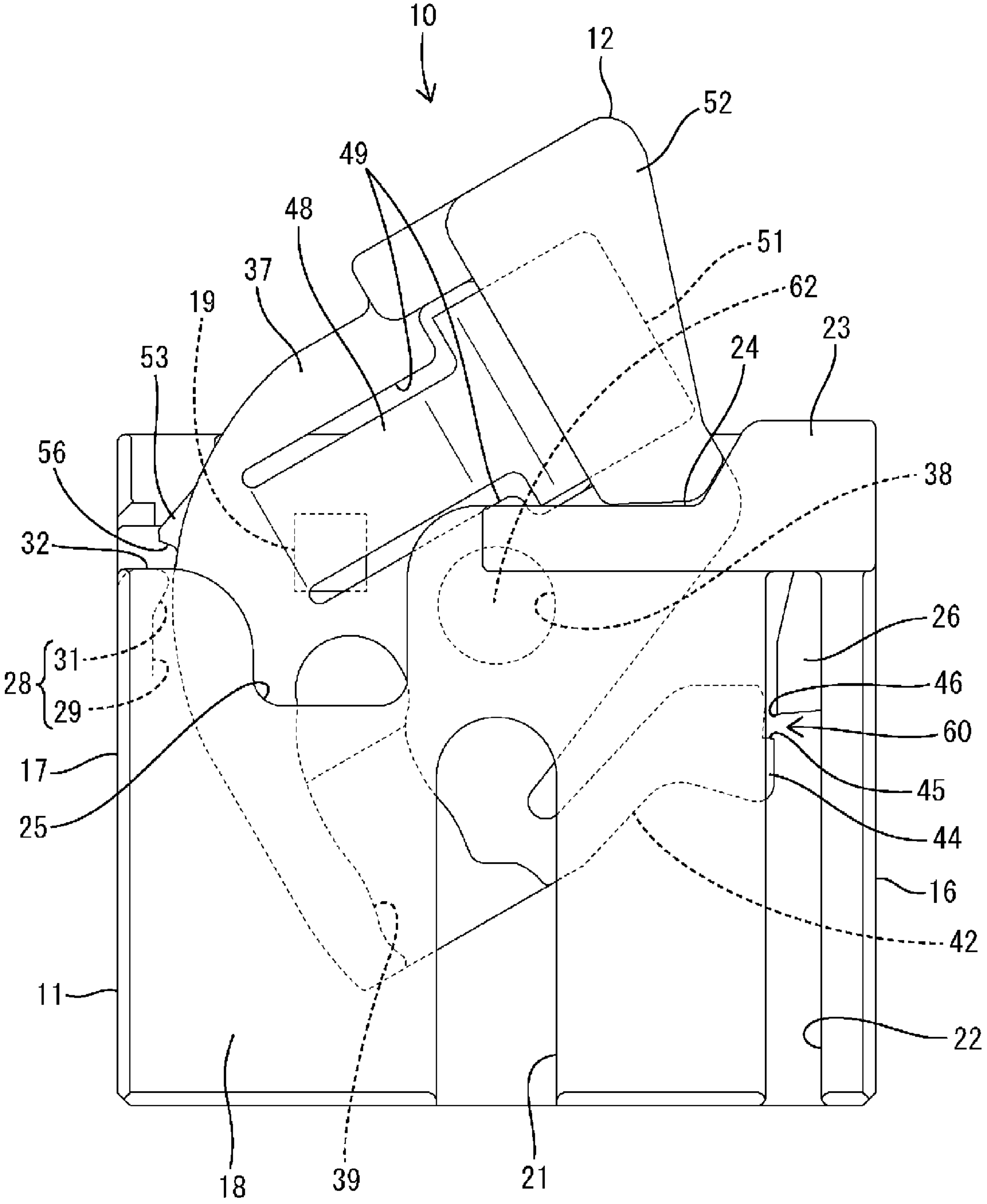
FIG. 2 is a plan view depicting a state where the lever is disposed close to one end of the range of play at the temporary locking position with respect to the housing.
Figure 3:
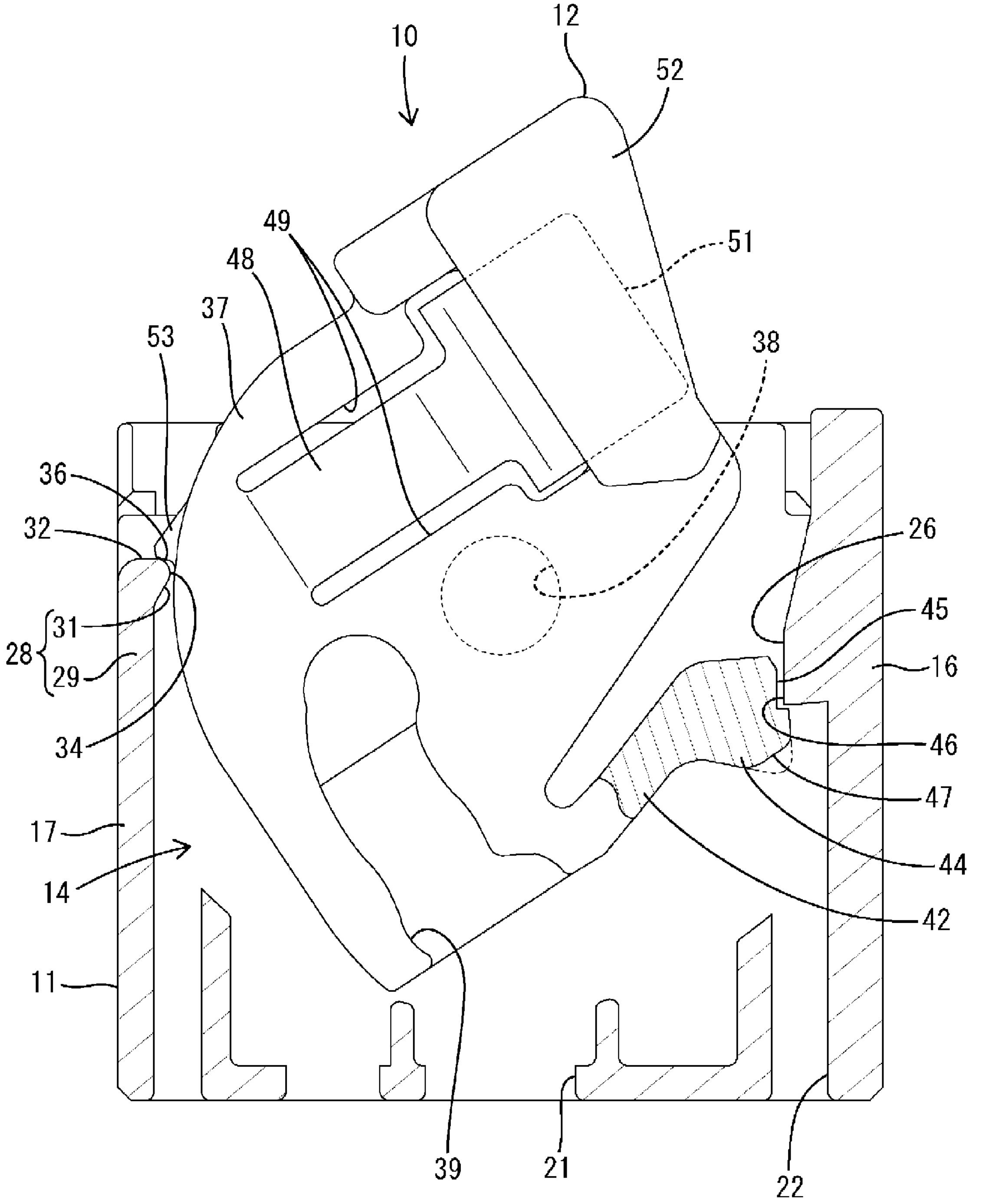
FIG. 3 is a broken plan view depicting a state where the lever is disposed close to another end of the range of play at the temporary locking position with respect to the housing, and a first locking surface and a second locking surface contact each other.

As depicted in FIGS. 3 and 4, at an upper end portion, the housing 11 has a housing portion 14 capable of housing the lever 12. The housing portion 14 is provided above a cavity region that houses the female terminal fittings 20. The housing portion 14 is delimited by the left and right side walls 16 and 17 and a top wall 18 (see FIG. 2) of the housing 11. As depicted in FIG. 2, the housing 11 has a locking portion 19 that protrudes inside the housing portion 14. Also on the inside of the housing portion 14, as depicted in FIG. 2, a support shaft 62 that supports the lever 12 is disposed so as to protrude.

The top wall 18 is formed in the shape of a flat plate. As depicted in FIG. 2, in the center in the width direction, the top wall 18 has an introduction channel 21 that extends in the front-rear direction and is open at the front. The support shaft 62 is disposed to a rear of this introduction channel 21. At one end in the width direction, the top wall 18 also has a receiver channel 22 that extends in the front-rear direction and is open at the front. The receiver channel 22 has a narrower channel width than the introduction channel 21, and is formed longer in the front-rear direction than the introduction channel 21. The introduction channel 21 has a role of allowing the cam follower 111 to pass through and guiding the cam follower 111 to a cam channel 39, described later, of the lever 12. The release portion 112 is inserted into the receiver channel 22.

On one side in the width direction, the top wall 18 has a thick stopper portion 23 which protrudes along a rear end of the top wall 18. In a center portion in the width direction of the rear end of the top wall 18, the stopper portion 23 has a recess 24 that is recessed toward the front. On the other side in the width direction at the rear end, the top wall 18 has a concave retracted portion 25 that is further recessed toward the front than the stopper portion 23. The locking portion 19 can be visually confirmed from above through the inside of the retracted portion 25.

Out of the left and right side walls 16 and 17, the side wall 16 on one side in the width direction has a housing-side locking portion 26 that protrudes into the housing portion 14. The housing-side locking portion 26 can be visually confirmed from above through the receiver channel 22. The housing-side locking portion 26 is formed in a trapezoidal shape. An inner surface, which is the protruding end of the housing-side locking portion 26, is linearly disposed along the front-rear direction. A front surface of the housing-side locking portion 26 is inclined so that the protruding end side projects toward the front.

As depicted in FIG. 1, out of the left and right side walls 16 and 17, the side wall 17 on the other side in the width direction has a pair of upper and lower slits 27 at an upper end portion that delimits the accommodating portion 14. Both slits 27 extend in the front-rear direction and are open to the rear at a rear end side of the upper end portion of the side wall 17.

Figure 5:
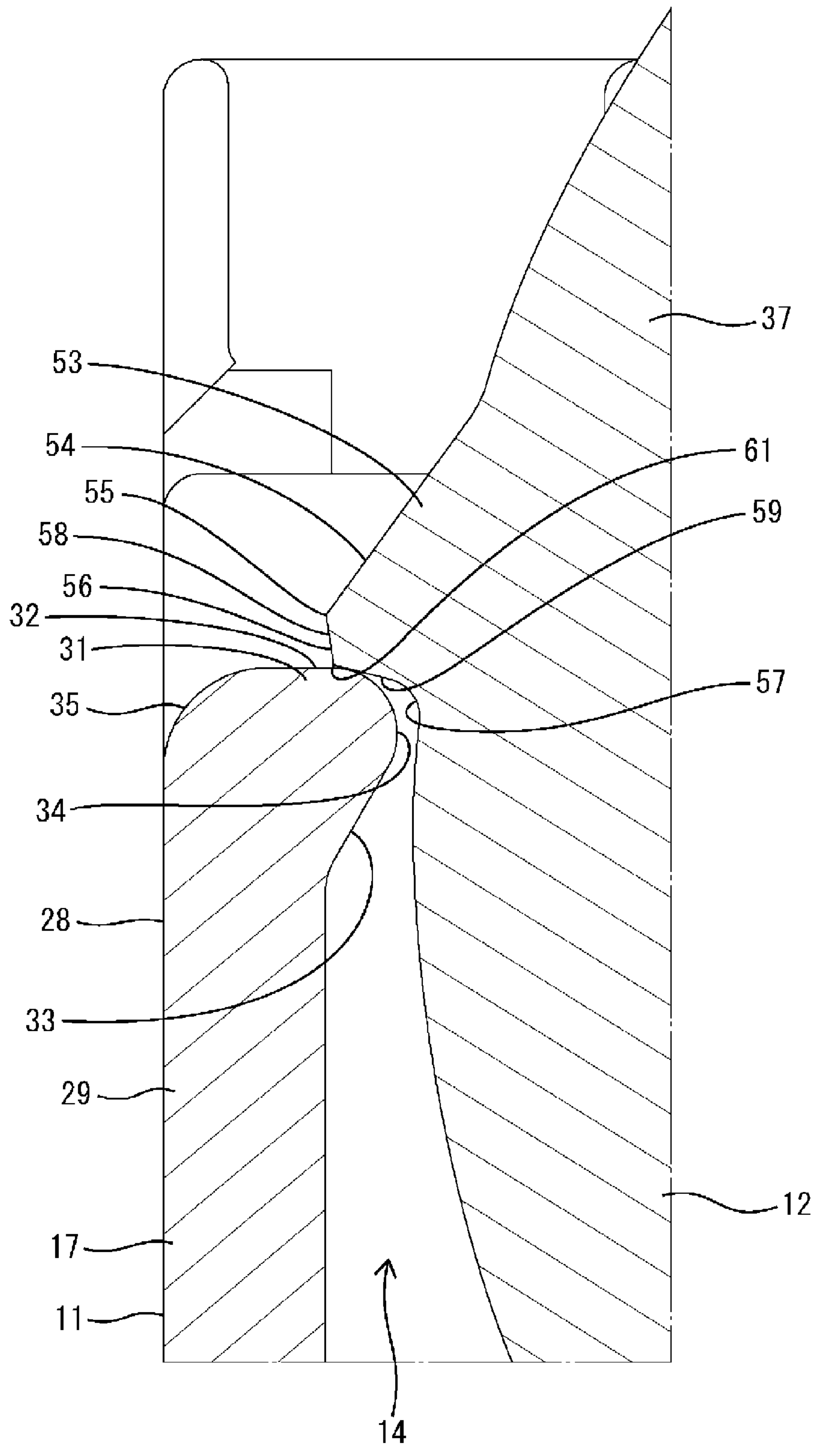
FIG. 5 is an enlarged cross-sectional view of the first locking portion and the second locking portion in the state depicted in FIG. 3.

The housing 11 has a first locking portion 28 between the slits 27 at the upper end of the side wall 17. The first locking portion 28 has an elastic portion 29, which extends from a front end between the slits 27 toward the rear in a cantilevered manner, and a locking protrusion 31 that protrudes from a rear end portion of the elastic portion 29 into the housing portion 14. As depicted in FIGS. 3 to 5, the elastic portion 29 constructs a part of the side wall 17 and is formed with a constant thickness. The elastic portion 29 is capable of flexibly deforming inwardly and outwardly with a front end portion as a pivot. As depicted in FIGS. 3 and 5, in a natural state, the elastic portion 29 is disposed along the front-rear direction.

Figure 6:
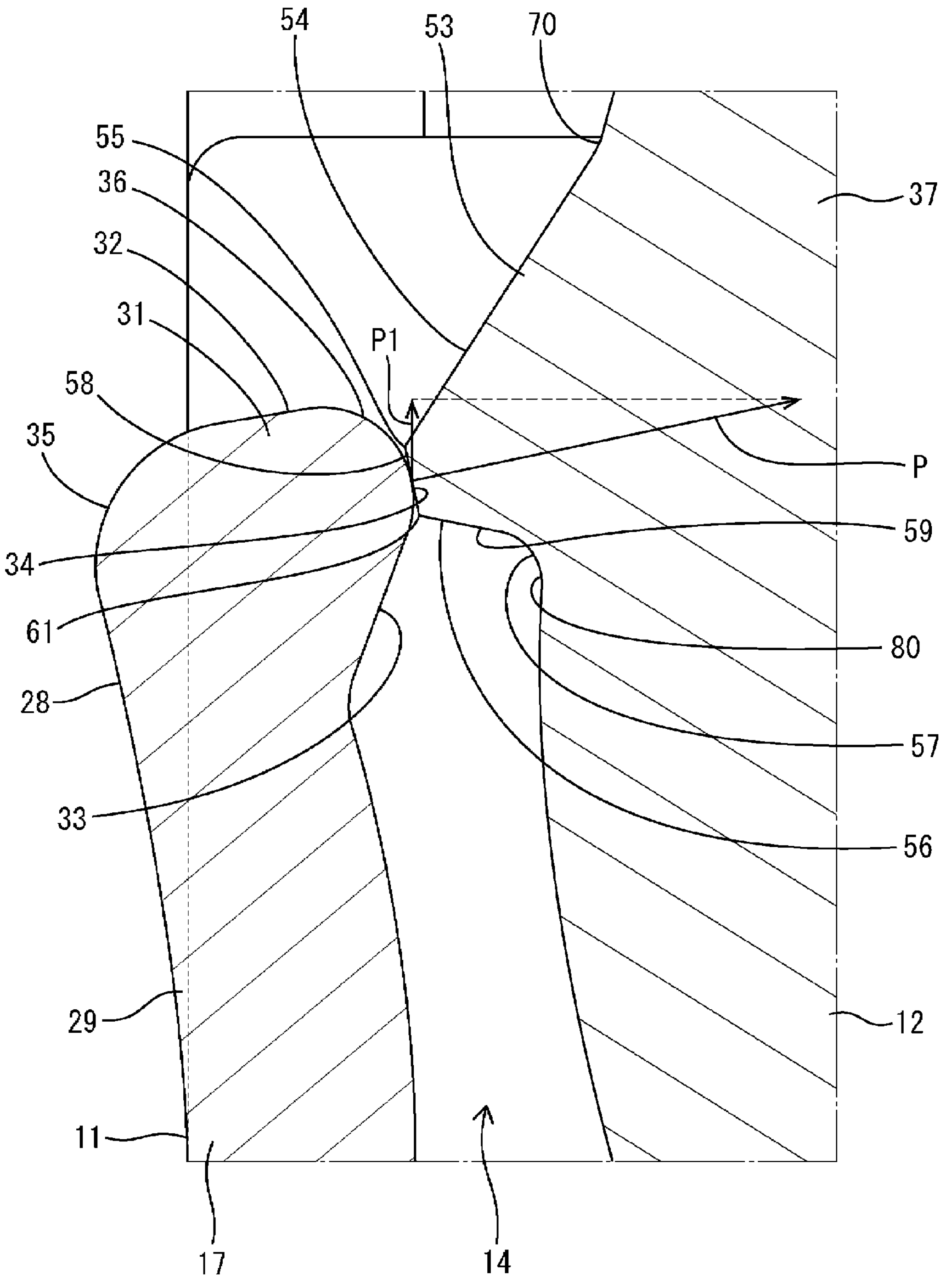
FIG. 6 is an enlarged cross-sectional view of the first locking portion and the second locking portion in the state depicted in FIG. 4.

As depicted in FIGS. 5 and 6, the locking protrusion 31 has a first locking surface 32, a first rising surface 33, and a first apex portion 34 disposed between the first locking surface 32 and the first rising surface 33. The first locking surface 32 is connected via a curved portion 35 to an outer surface of the elastic portion 29 (which is the outer surface of the side wall 17), and is linearly disposed in a direction that intersects the outer surface of the elastic portion 29. As depicted in FIG. 5, when the elastic portion 29 is in the natural state, the first locking surface 32 is disposed along the width direction.

The first rising surface 33 is connected to an inner surface of the elastic portion 29 (which is the inner surface of the side wall 17), and is linearly inclined inward in the width direction with respect to the inner surface of the elastic portion 29 so as to extend deeper inside the housing portion 14 toward the rear. A surface direction of the first rising surface 33 and a surface direction of the first locking surface 32 intersect each other at an acute angle with the first apex portion 34 positioned in between.

The first apex portion 34 is curved in an arc from the first locking surface 32 to the first rising surface 33. The first apex portion 34 intersects the first locking surface 32 and the first rising surface 33, and is formed as a curved surface whose radius of curvature is smaller than that of the curved portion 35.

As depicted in FIG. 3, a curved surface portion 36, which faces the rear out of the first apex portion 34, and the first locking surface 32 can be visually confirmed when the housing 11 is viewed from the rear in a state where the lever 12 has not been assembled inside the housing portion 14.

(Lever)

Figure 7:
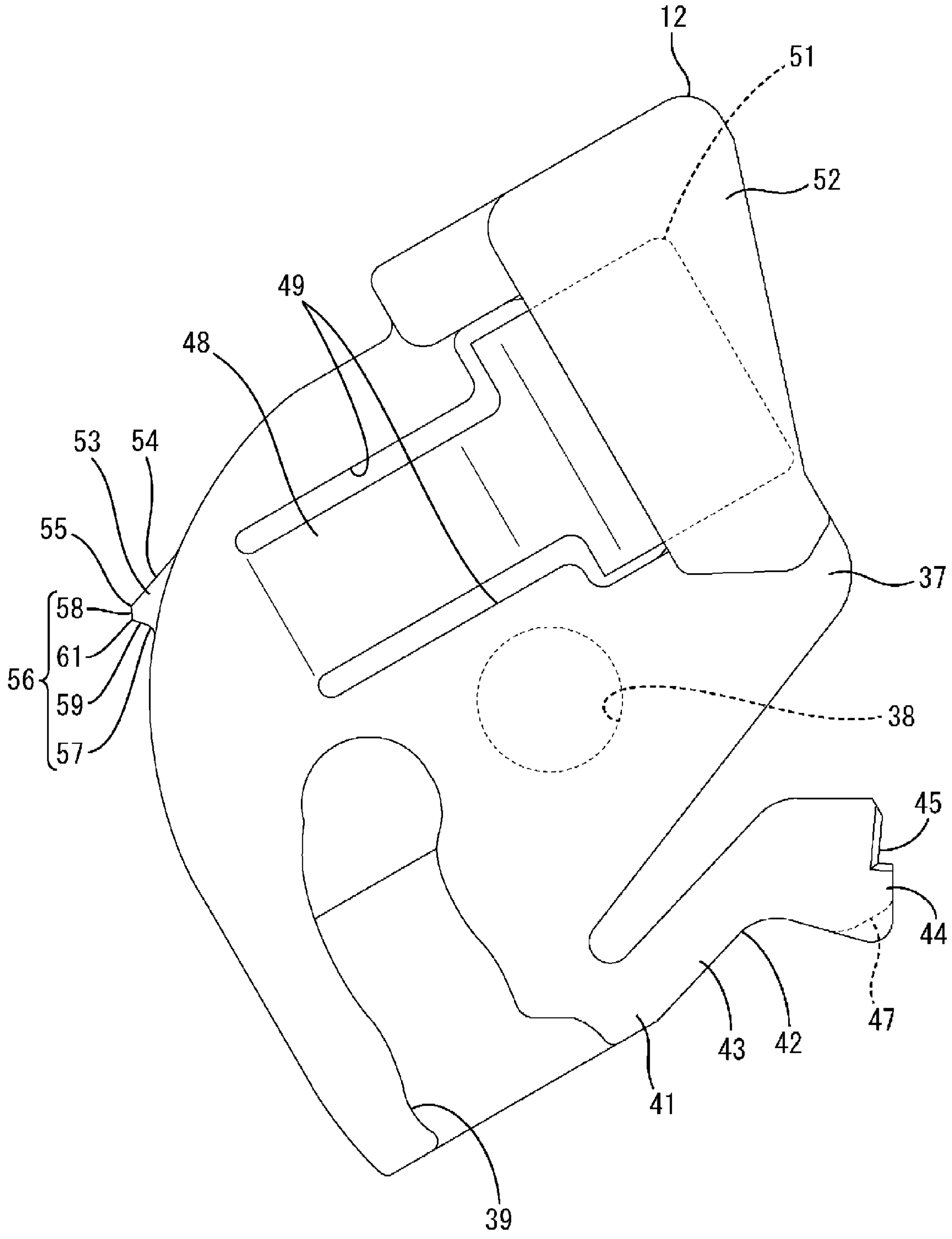
FIG. 7 is a plan view of the lever.

The lever 12 is made of synthetic resin and as depicted in FIG. 7 has a lever main body 37 in the form of a single plate. The lever main body 37 has a bearing portion 38 that is open on a lower-side plate surface. When the lever 12 is assembled inside the housing portion 14, the support shaft 62 fits into this bearing portion 38. The lever 12 is rotatable about the support shaft 62 fitted into the bearing portion 38 between the temporary locking position and the main locking position.

The lever main body 37 has the cam channel 39 that is open on an upper-side plate surface. The cam channel 39 is also open at an outer peripheral edge of the lever main body 37. As depicted in FIG. 4, when the lever 12 is at the temporary locking position, the cam follower 111 of the mating housing 100 enters the entrance of the cam channel 39. As the lever 12 rotates from the temporary locking position to the main locking position, the cam follower 111 maintains sliding contact with a channel surface of the cam channel 39, which pulls the mating housing 100 toward the housing 11 and progressively fits the two housings 11 and 100 together. When the lever 12 has reached the main locking position, the cam follower 111 becomes disposed at the inner end of the cam channel 39 and the two housings 11 and 100 become properly fitted together. When the two housings 11 and 100 are properly fitted together, the respective female terminal fittings 20 and the respective male terminal fittings 120 are electrically connected.

The lever main body 37 has a lever-side locking portion 42 that protrudes rearward as a cantilever from a base end portion 41 on an outer peripheral edge of the lever main body 37 near the entrance to the cam channel 39. As depicted in FIG. 7, the lever-side locking portion 42 has an extending portion 43 disposed linearly from the base end portion 41, and a locking main body 44 that protrudes diagonally outward with respect to the extending portion 43. The extending portion 43 is capable of flexibly deforming inwardly and outwardly in the width direction with the base end portion 41 as a pivot.

At a corner on the rear end, the locking main body 44 has a locking recess 45 in the form of an L-shaped notch. As depicted in FIG. 3, at the temporary locking position, the locking recess 45 faces a front end angled region 46 formed from an inner surface to a front surface of the housing-side locking portion 26. At a corner on a front end, the locking main body 44 has a relief recess 47 shaped so that a lower surface side is diagonally cut out.

The lever main body 37 has a locking arm 48 on an opposite side in the width direction to the side with the bearing portion 38, the cam channel 39, and the lever-side locking portion 42. The locking arm 48 is disposed so as to be capable of flexible deformation between a pair of cutouts 49 formed in the lever main body 37. At the main locking position, the locking arm 48 becomes locked to the locking portion 19 (see FIG. 2). The two housings 11 and 100 are held in the fitted-together state by locking of the locking arm 48 and the locking portion 19. At the main locking position, a front portion of the locking arm 48 is disposed inside the retracted portion 25. By doing so, interference between the locking arm 48 and the top wall 18 is avoided.

At a rear end portion (that is, an end portion located at the rear at the main locking position), the locking arm 48 has a lock releasing portion 51 which extends in the width direction. The locking of the locking arm 48 and the locking portion 19 is released by pressing this lock releasing portion 51. By rotating the lever 12 toward the temporary locking position after the locking of the locking arm 48 and the locking portion 19 has been released, it is possible to return the lever 12 from the main locking position to the temporary locking position.

The lever 12 has a bridge-shaped erected part 52 at a rear end of the lever main body 37. The erected part 52 covers the outside of the lock releasing portion 51 and prevents unintended releasing operations of the lock releasing portion 51. As depicted in FIG. 2, an inner edge portion of the erected part 52 is formed in a protruding shape that fits into the recess 24 of the stopper portion 23 at the temporary locking position.

The lever 12 has a second locking portion 53 that protrudes on an outer peripheral edge of the lever body 37. The second locking portion 53 is disposed at a position close to the front end portion of the locking arm 48. The second locking portion 53 is formed in a claw shape. The second locking portion 53 is formed with a constant thickness within a range of the thickness of the lever main body 37. As depicted in FIG. 7, the second locking portion 53 has a second rising surface 54, a top portion 55, and a second locking surface 56.

The top portion 55 is formed on a front end in the protruding direction of the second locking portion 53. The top portion 55 is a part where the second rising surface 54 and the second locking surface 56 intersect, and is configured as an obtuse-angled apex part between the second rising surface 54 and the second locking surface 56.

The second rising surface 54 is connected to the top portion 55 on the opposite side (or rear side) to the side in which the lever 12 rotates toward the main locking position. As depicted in FIG. 6, the second rising surface 54 is linearly disposed at a constant inclination angle from a connecting position 70 on the outer peripheral edge of the lever main body 37 to the top portion 55. The second rising surface 54 is an inclined surface with a gentle inclination angle with respect to the tangential direction at the connecting position 70 on the outer peripheral edge of the lever main body 37.

The second locking surface 56 is connected to the top portion 55 on the side (or front side) in which the lever 12 rotates toward the main locking position. As depicted in FIG. 6, the second locking surface 56 has a curved side 57 that connects to a connecting position 80 on the outer peripheral edge of the lever main body 37. The curved side 57 is formed as a U-shaped recess when viewed from the front.

Between the curved side 57 and the top portion 55, the second locking surface 56 has an inclined side 58 and a locking side 59 with respectively different inclination angles with respect to a tangential direction at the connecting position 80 on the outer peripheral edge of the lever body 37. The second locking surface 56 has a second apex portion 61 between the inclined side 58 and the locking side 59.

The locking side 59 is linearly arranged at a constant inclination angle from the curved side 57 to the inclined side 58. The locking side 59 forms a right angle or an angle close to a right angle with respect to the tangential direction at the connecting position on the outer peripheral edge of the lever body 37. The inclined side 58 is linearly disposed at a constant inclination angle from the second apex portion 61 to the top portion 55. The inclined side 58 is an inclined surface with a gentle inclination angle of 45 degrees or lower with respect to the tangential direction at the connecting position on the outer peripheral edge of the lever main body 37.

The inclined side 58 is disposed between the top portion 55 and the second apex portion 61, and is connected at an obtuse angle to the second rising surface 54 via the top portion 55. The inclined side 58 connects at an obtuse angle to the locking side 59 via the second apex portion 61. When the lever 12 is at the temporary locking position, the inclined side 58 is disposed so as to be inclined to one side in the width direction toward the front.

The length (that is, the length in the inclined direction) of the inclined side 58 is smaller than the length of the locking side 59. The length of the second rising surface 54 is greater than the sum of the length of the inclined side 58 and the length of the locking side 59.

(Temporary Locking Structure and Temporary Locking Releasing Structure of Lever)

The lever 12 may rotate with respect to the housing 11 within a range of play at the temporary locking position. When the lever 12 is at one end of the range of play at the temporary locking position, as depicted in FIG. 2, the inner edge portion of the erected part 52 is disposed to fit into the recess 24 of the stopper portion 23 so as to be lockable. By doing so, the lever 12 is restricted from rotating from the temporary locking position in the opposite direction to the main locking position. At this time, the locking recess 45 of the lever-side locking portion 42 is disposed away from the front end angled region 46 of the housing-side locking portion 26. The second locking surface 56 of the second locking portion 53 is also disposed away from the first locking surface 32 of the first locking portion 28.

On the other hand, when the lever 12 is at the other end of the range of play at the temporary locking position, as depicted in FIG. 3, the locking recess 45 of the lever-side locking portion 42 is disposed so as to be capable of fitting together with and locking on the front end angled region 46 of the housing-side locking portion 26. Also, as depicted in FIG. 5, the locking side 59 of the second locking surface 56 is disposed so as to face and be capable of locking on the first locking surface 32. In more detail, the locking side 59 of the second locking surface 56 is disposed so as to contact a front end region (that is, a first apex portion 34-side region) of the first locking surface 32 at a gentle angle of inclination or in parallel. By doing so, rotation of the lever 12 from the temporary locking position toward the main locking position is restricted.

Note that as depicted in FIG. 2, when the lever 12 is at one end in the range of play at the temporary locking position, a gap 60 that allows flexible deformation of the extending portion 43 of the lever-side locking portion 42 is formed between the locking recess 45 of the lever-side locking portion 42 and the front end angled region 46 of the housing-side locking portion 26.

Also, when the lever 12 is at the temporary locking position, the entrance of the cam channel 39 communicates with the introduction channel 21. In this state, as depicted in FIG. 4, the housing 11 is shallowly fit inside the mating housing 100. When that happens, the cam follower 111 comes disposed at the entrance of the introduction channel 21 and the cam channel 39.

When the housing 11 has been shallowly fitted into the mating housing 100, the release portion 112 is inserted into the receiver channel 22. A front end of the release portion 112 abuts the locking body 44 of the lever-side locking portion 42 and the locking body 44 becomes pressed by the release portion 112, causing flexible deformation of the extending portion 43. Bending of the extending portion 43 is allowed within the range of play (that is, the gap 60) at the temporary locking position. When flexible deformation of the extending portion 43 occurs, interference between the front end angled region 46 of the housing side locking portion 26 and the locking main body 44 is avoided by the relief recess 47.

Next, the operator presses the erected part 52 or the like to rotate the lever 12 from the temporary locking position to the main locking position. At the start of rotation of the lever 12, the second locking portion 53 presses the first locking portion 28 causing flexible deformation of the elastic portion 29, the second apex portion 61 passes over the first apex portion 34 and then the bending of the elastic portion 29 is eliminated. As the elastic portion 29 elastically recovers, the elastic portion 29 will hit the outer peripheral edge of the lever 12, causing a knocking sound. By hearing this knocking sound and/or feeling a change in the operating force due to the elimination of the bending of the elastic portion 29, it is possible for the operator to recognize that the locked state of the lever 12 at the temporary locking position has been released.

After this, the lever 12 reaches the main locking position, where the locking arm 48 locks onto the locking portion 19 so that the two housings 11 and 100 become held in the properly fitted state.

However, before the two housings 11 and 100 are fitted together, as one example, there can be cases where a foreign object interferes with the erected part 52 so that an external force F (see FIG. 4) acts on the lever 12 at the temporary locking position in a direction in which the lever 12 rotates toward the main locking position. When such an external force F acts, there are concerns that the second locking portion 53 will press the locking protrusion 31 of the first locking portion 28 at the other end of the range of play, resulting in unintended flexible deformation of the elastic portion 29. When this happens, if bending of the elastic portion 29 is not eliminated and the elastic portion 29 remains flexibly deformed, at the start of a rotation operation of the lever 12, the operator will not be able to obtain the sense of release described above and recognize that the locked state of the lever 12 has been released.

However, the first embodiment ensures that bending of the elastic portion 29 will have been eliminated when the operator performs a rotation operation of the lever 12. In more detail, if flexible deformation of the elastic portion 29 occurs before the two housings 11 and 100 have been fitted together, as depicted in FIG. 6, the inclined side 58 of the second locking surface 56 will contact the first apex portion 34 of the locking projection 31. At this time, the inclined side 58 becomes disposed so as to be inclined and approach the curved surface portion 36 and the first locking surface 32 side from the first apex portion 34 in the front-rear direction.

In this state, the elastic portion 29 will try to elastically recover from the bent state in a recovery direction where the bending is eliminated. The first apex portion 34 will press the inclined side 58 of the second locking surface 56 in the recovery direction of the elastic portion 29. As depicted in FIG. 6, a pressing force P will act on the second locking portion 53 in a direction perpendicular to the surface direction of the inclined side 58, and a rearward component force P1 will also act as a partial force (or "component") of the pressing force P. As a result, the second locking portion 53 becomes rearwardly displaced with respect to the first apex portion 34 by the component force P1. Meanwhile, the first apex portion 34 slides on the inclined side 58 and becomes displaced toward the second apex portion 61. As this happens, bending of the elastic portion 29 will become automatically eliminated. When the first apex portion 34 has passed over the second apex portion 61, the bending of the elastic portion 29 is instantly eliminated, and the elastic portion 29 returns to the natural state. When the elastic portion 29 has returned to the natural state, as depicted in FIG. 5, the first locking surface 32 will face the locking side 59 of the second locking surface 56 so as to be lockable.

In the case of the first embodiment, the first apex portion 34 is set so as to contact the inclined side 58 even when the elastic portion 29 has maximally bent within the range of play at the temporary locking position. This means that no matter how the elastic portion 29 bends within the range of play for the lever 12 at the temporary locking position, the first locking portion 28 and the second locking portion 53 can be kept in a lockable state by the inclined side 58.

As described above, according to the first embodiment, since the inclined side 58 of the second locking surface 56 is disposed so as to be inclined from the first apex portion 34 toward the first locking surface 32, even if the lever 12 is inadvertently rotated within the range of play at the temporary locking position and the elastic portion 29 of the first locking portion 28 becomes temporarily bent, the second locking surface 56 will become displaced toward a side facing the first locking surface 32, which makes it possible to return to a state where the first locking portion 28 and the second locking portion 53 are lockable. As a result, the bending of the elastic portion 29 can be automatically eliminated. This ensures that when the operator starts a rotation operation of the lever 12, the first locking surface 32 and the second locking surface 56 will face each other in a lockable state. As a result, the operator can moderately experience the state of the bending of the first locking portion 28 being eliminated, and can appropriately proceed with a rotation operation of the lever 12.

In particular, in the first embodiment, the gap 60, which allows the lever-side locking portion 42 to bend when the lever 12 is at the temporary locking position, is formed between the lever-side locking portion 42 and the housing-side locking portion 26, which means the range of play including the gap 60 can be large. Since it is easy for the lever 12 to rotate within the range of play at the temporary locking position, there is a large merit to using the above configuration which enables the first locking portion 28 and the second locking portion 53 to return to the lockable state.

Also, since the second locking portion 53 has the top portion 55 between the inclined side 58 and the second rising surface 54, it is possible to easily adjust the inclination angle and the formation range of the inclined side 58 by changing the relative position of the top portion 55 with respect to the first locking portion 28.

Additionally, the second locking surface 56 has an inclined side 58 and a locking side 59 with the second apex portion 61 in between, and at the temporary locking position, the locking side 59 is capable of facing and contacting the first locking surface 32 in parallel or at a gentler angle of inclination than the inclined side 58. This makes it possible to favorably ensure that the second locking portion 53 exerts a locking force on the first locking portion 28.

(Second Embodiment)

Figure 9:
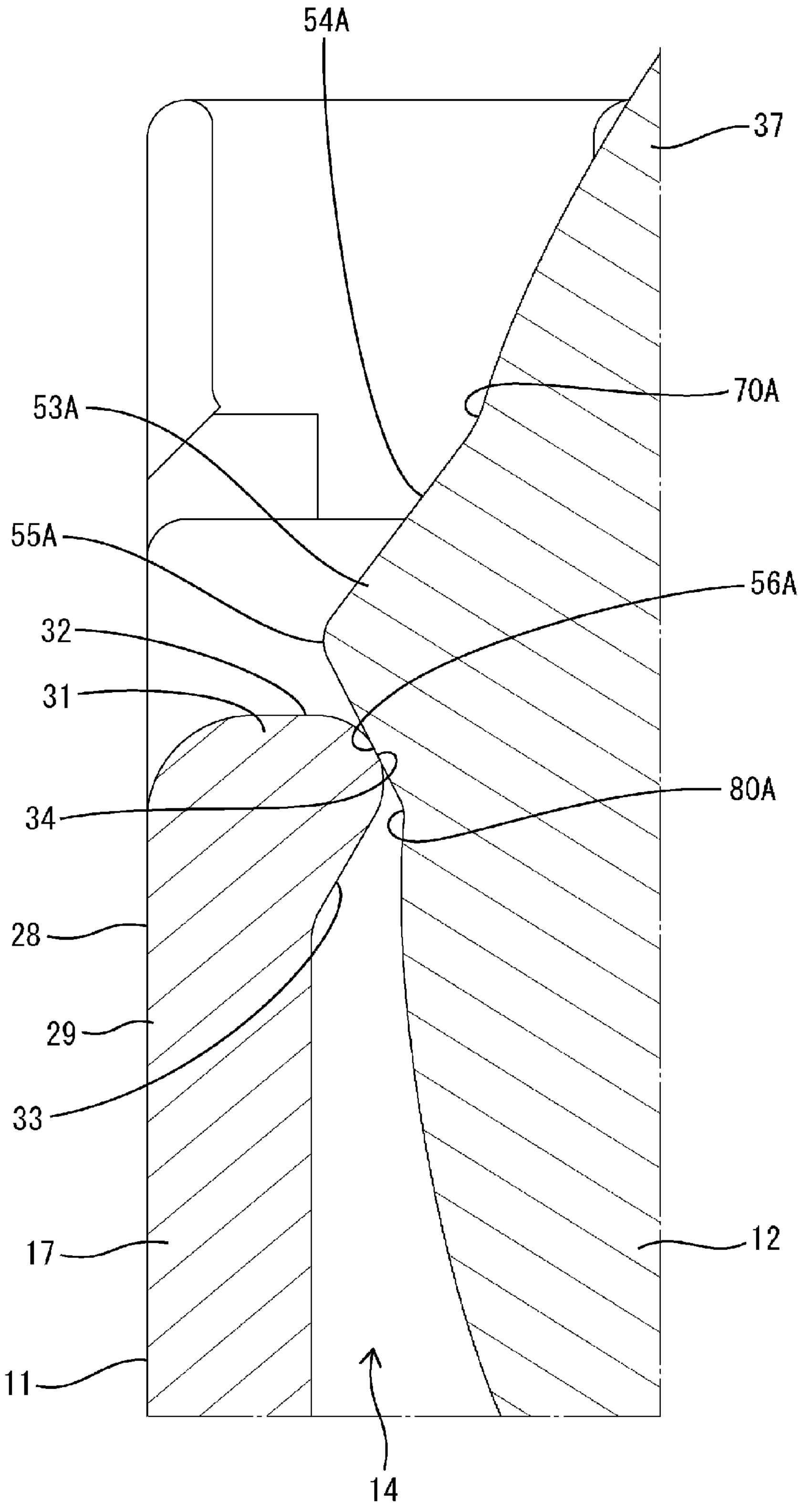
FIG. 9 is an enlarged cross-sectional view depicting a state where, for a connector according to a second embodiment, a first apex portion of a first locking portion and a second locking surface contact each other and are locked when a lever is at a temporary locking position.
Figure 10:
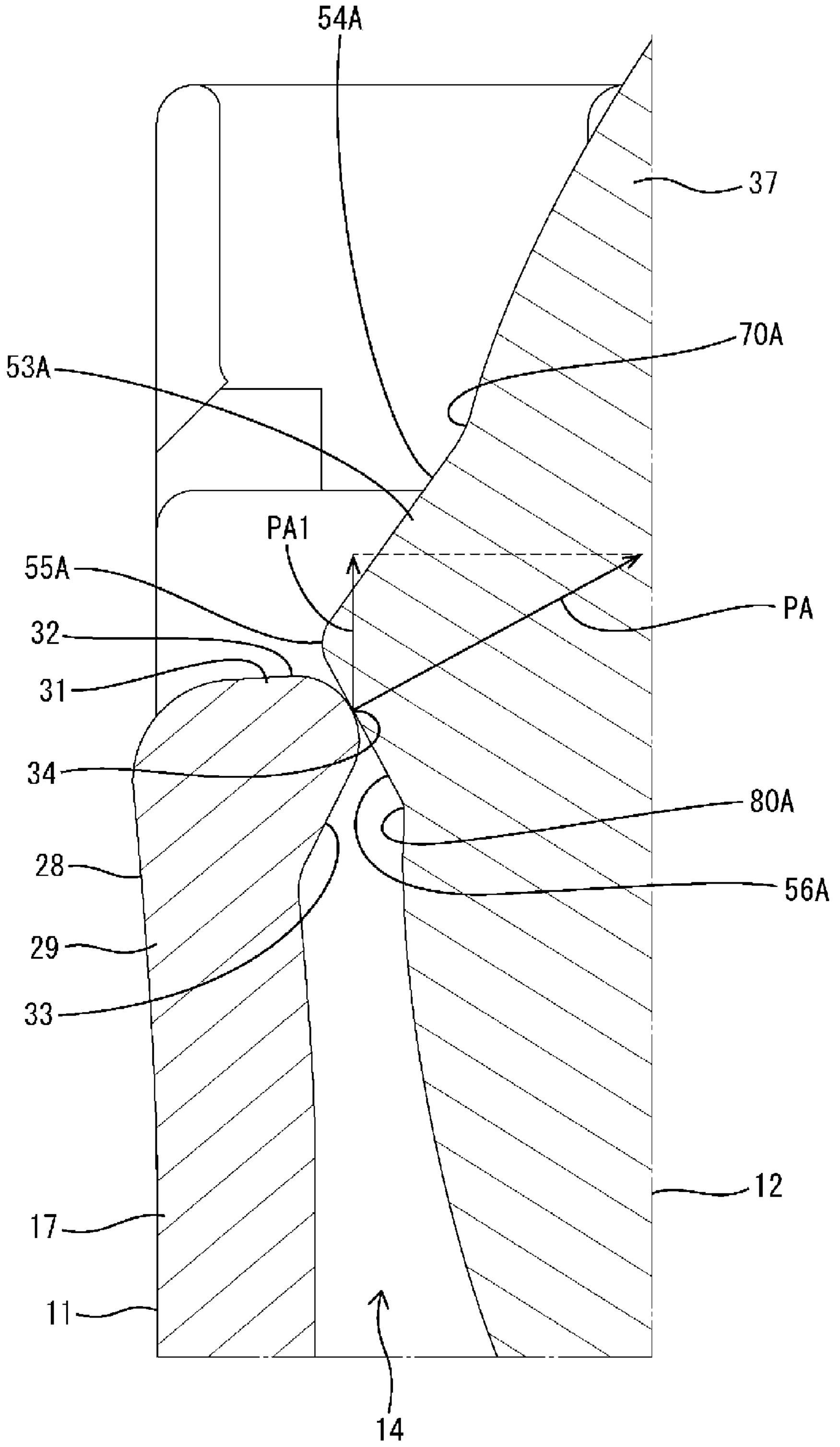
FIG. 10 is an enlarged cross-sectional view depicting a state where the first locking portion has temporarily bent from the state depicted in FIG. 9.

Next, a second embodiment of the present disclosure will be described with reference to FIGS. 9 and 10. In this second embodiment, the shape of a second locking portion 53A differs to the first embodiment described above. Other elements are the same as in the first embodiment. In the following description, identical or corresponding structures as those in the first embodiment have been assigned the same reference numerals and redundant description is omitted.

The second locking portion 53A is triangular in cross section and protrudes on the outer peripheral edge of the lever main body 37. The second locking portion 53A has a top portion 55A at a front end in the protruding direction, a second rising surface 54A located to the rear of the top portion 55A, and a second locking surface 56A located to the front of the top portion 55A.

The top portion 55A is a part where the second rising surface 54A and the second locking surface 56A intersect, and is configured as an obtuse-angled apex part between the second rising surface 54A and the second locking surface 56A.

The second rising surface 54A is linearly disposed at a constant inclination angle from a connecting position 70A on the outer peripheral edge of the lever main body 37 to the top portion 55A. The second rising surface 54A is an inclined surface with a gentle angle of inclination with respect to the tangential direction at the connecting position 70A on the outer peripheral edge of the lever main body 37. The length (that is, the length in the inclined direction) of the second rising surface 54A is shorter than the length of the second rising surface 54A in the first embodiment.

The second locking surface 56A is linearly disposed at a constant inclination angle from a connecting position 80A on the outer peripheral edge of the lever main body 37 to the top portion 55A. The second locking surface 56A as a whole is configured as an inclined side 58A. The second locking surface 56A does not have a part corresponding to the second apex portion 61 in the first embodiment. The second locking surface 56A as a whole is an inclined surface with a gentle angle of inclination of 45 degrees ($\pi/4$) or below with respect to the tangential direction at the connecting position 80A on the outer peripheral edge of the lever main body 37. The angle of inclination of the second locking surface 56A is the same as or close to the angle of inclination of the first locking surface 32. The angle of inclination of the second locking surface 56A is larger than the angle of inclination of the inclined side 58A in the first embodiment and smaller than the angle of inclination of the locking side 59 in the first embodiment. The length of the second locking surface 56A is shorter than the length of the second rising surface 54A.

If inadvertent flexible deformation of the elastic portion 29 occurs when the lever 12 is present at the temporary locking position before the two housings 11 and 100 are fitted together, the first apex portion 34 will come into contact with the second locking surface 56A. When the elastic portion 29 has flexibly deformed by a maximum amount, the first apex portion 34 will contact a rear portion of the second locking surface 56A. The pressing force PA caused by the bending of the elastic portion 29 and the component force PA1 as a partial force (or "component") of the pressing force PA will act on the second locking portion 53A. The second locking portion 53A becomes rearwardly displaced with respect to the first apex portion 34 by the component force PA1. Meanwhile, the first apex portion will become displaced to the front on the inclined side 58A. By doing so, the bending of the elastic portion 29 becomes automatically eliminated. When the elastic portion 29 has returned to the natural state, the first apex portion 34 is displaced toward a front portion of the second locking surface 56A. In this second embodiment, the first apex portion 34 is a part that faces and is capable of locking on the second locking surface 56A at the temporary locking position. The second locking surface 56A is the inclined side 58A and is also a part that faces and is capable of locking on the first apex portion 34. This means that according to the second embodiment, a state in which the first locking portion 28 and the second locking portion 53A are locked at the temporary locking position is appropriately produced.

[Other Embodiments of the Present Disclosure]

It should be understood that the embodiments disclosed herein are exemplary in all respects and not restrictive.

Although the first locking portion that is capable of flexible deformation is provided on the housing and the second locking portion that is not capable of flexible deformation is provided on the lever in the first and second embodiments described above, as another embodiment, it is also possible to provide a first locking portion that is capable of flexible deformation on the lever and provide a second locking portion that is not capable of flexible deformation on the housing.

Although the lever-side locking portion is capable of flexible deformation and the housing-side locking portion is rigid and does not flexibly deform in the first and second embodiments described above, as another embodiment, it is also possible to use a configuration where the lever-side locking portion is rigid and does not flexibly deform and the housing-side locking portion is capable of flexible deformation.

Although the lever at the temporary locking position is primarily held by the housing-side locking portion and the lever-side locking portion and is secondarily held by the first locking portion and the second locking portion in the first and second embodiments described above, as another embodiment, it is also possible to use a configuration where the housing-side locking portion and the lever-side locking portion are omitted from the connector, and the lever at the temporary locking position is held by only the first locking portion and the second locking portion.

In the first and second embodiments described above, the first apex portion has a rounded shape. However, as another embodiment, the first apex portion may be formed in a sharply pointed shape.

In the first embodiment described above, the second apex portion is formed in a sharply pointed shape. However, as another embodiment, the second apex portion may have a rounded shape.

In the first embodiment described above, the second locking surface is composed of an inclined side, a locking side, a second apex portion and a curved side. However, as another embodiment, the second locking surface may be composed of an inclined side and a second apex portion without having a curved side.

In the first embodiment described above, the locking side is disposed so as to contact the first locking surface at a gentle inclination angle at the temporary locking position. However, as another embodiment, the locking side may be disposed so as to contact the first locking surface in parallel at the temporarily locking position.

In the embodiments described above, the lever is composed of a lever main body in the form of a single plate, but as another embodiment, the lever may be a gate-shaped lever where a pair of lever main bodies are connected by a connecting portion.

LIST OF REFERENCE NUMERALS

10 Connector
11 Housing
12 Lever
13 Guide channel
14 Housing portion
16, 17 Left and right side walls
18 Top wall
19 Locking portion
20 Female terminal fitting
21 Introduction channel
22 Receiver channel
23 Stopper portion
24 Recess
25 Retracted part
26 Housing-side locking portion
27 Slit
28 First locking portion
29 Elastic portion
31 Locking protrusion
32 First locking surface
33 First rising surface
34 First apex portion
35 Curved portion
36 Curved surface portion
37 Lever main body
38 Bearing portion
39 Cam channel
41 Base end portion
42 Lever-side locking portion
43 Extending portion
44 Locking main body
45 Locking recess
46 Front end angled region
47 Relief recess
48 Locking arm
49 Cut out
51 Lock releasing portion

52 Erected part
53, 53A Second locking portion
54, 54A Second rising surface
55, 55A Top portion
56, 56A Second locking surface
57 Curved side
58, 58A Inclined side
59 Locking side
60 Gap
61 Second apex portion
62 Support shaft
70, 70A, 80, 80A Connecting position
90 Wire
100 Mating housing
110 Hood portion
111 Cam follower
112 Release portion
113 Guide portion
120 Male terminal fittings
F External force
P, PA Pressing force
P1, PA1 Component force

What is claimed is:

1. A connector comprising:
a housing; and
a lever that is supported by the housing and rotates from a temporary locking position to a main locking position to progressively fit the housing together with a mating housing,
wherein
one of the housing and the lever is provided with a first locking portion capable of flexible deformation and another of the housing and the lever is provided with a second locking portion,
the first locking portion has a first apex portion and a first locking surface that is connected to the first apex portion,
the second locking portion has a second locking surface that contacts the first locking portion and stops the lever at the temporary locking position, and a second rising surface disposed on a side opposite to the second locking surface,
the second locking surface has an inclined side which is disposed, in an engaged state where the first locking portion has bent due to interference between the first apex portion and the second locking portion, so as to be inclined from the first apex portion toward the first locking surface, and
the inclined side of the second locking surface has
one end terminating at a top portion of the second locking portion, the top portion being disposed between the inclined side and the second rising surface,
another end opposite to the one end terminating at a second apex portion of the second locking surface, the second apex portion being disposed between the inclined side and a locking side of the second locking surface that intersects the inclined side, and
an angle of inclination configured such that the top portion is positioned outwardly from the second apex portion when the inclined side is in the engaged state.

2. The connector according to claim 1, wherein
when the first locking portion is in a natural state at the temporary locking position, the locking side is disposed so as to face and contact the first locking surface in parallel or at a shallower angle of inclination than the angle of inclination of the inclined side.

3. The connector according to claim 1, wherein the housing includes a housing-side locking portion, the lever includes a lever-side locking portion that is locked to the housing-side locking portion at the temporary locking position, one of the housing-side locking portion and the lever-side locking portion is capable of flexible deformation, a locking state of the housing-side locking portion and the lever-side locking portion is released by a release portion of the mating housing, a gap, which allows the one of the housing-side locking portion and the lever-side locking portion to deform, is formed between the lever-side locking portion and the housing-side locking portion, and the lever is capable of rotating with respect to the housing within a range of the gap at the temporary locking position.

4. The connector according to claim 1, wherein the second locking portion is formed on an outer peripheral edge of the lever, the outer peripheral edge of the lever includes a connecting position for engaging the first locking portion during rotation of the lever, one end of the second locking surface has a curved side formed as a U-shaped recess that connects to the connecting position, and each of the inclined side and the locking side has a different inclination angle with respect to a tangential direction at the connecting position on the outer peripheral edge of the lever.

5. The connector according to claim 4, wherein the locking side is linearly arranged at a constant inclination angle from the curved side to the inclined side.

6. The connector according to claim 4, wherein the locking side forms a right angle with respect to the tangential direction at the connecting position on the outer peripheral edge of the lever.

7. The connector according to claim 4, wherein the inclined side is linearly disposed at a constant inclination angle from the second apex portion to the top portion.

8. The connector according to claim 4, wherein the inclination angle of the inclined side is 45 degrees or lower with respect to the tangential direction at the connecting position on the outer peripheral edge of the lever.

* * * * *